United States Patent [19]

Kataoka et al.

[11] 3,800,062
[45] Mar. 26, 1974

[54] COOLING METHOD FOR TRANSMISSION CABLES

[75] Inventors: Hirobumi Kataoka; Kazunari Suzuki; Yoshio Takayama; Yoshisuke Iwata, all of Tokyo, Japan

[73] Assignees: Kanto Tar Products Co. Ltd.; Furukawa Denki Kagyo Co., Ltd., both of Tokyo, Japan

[22] Filed: July 24, 1972

[21] Appl. No.: 274,208

[30] Foreign Application Priority Data
July 24, 1971   Japan................. 46-55538
Dec. 30, 1971   Japan................. 46-1092

[52] U.S. Cl............ 174/15 C, 165/105, 165/143, 165/172, 174/27, 174/DIG. 6
[51] Int. Cl............................................. H01v 11/00
[58] Field of Search........... 174/DIG. 6, 15 R, 15 C, 174/16, 256, 27, 99 B; 165/143, 144, 172, 177, 105

[56] References Cited
UNITED STATES PATENTS

| | | | |
|---|---|---|---|
| 2,141,912 | 12/1938 | Hobart | 174/27 UX |
| 3,085,180 | 4/1963 | Zwijsen | 165/105 |
| 3,463,869 | 8/1969 | Cooley et al. | 174/15 C |
| 655,838 | 8/1900 | Tesla | 174/DIG. 6 |
| 2,066,321 | 1/1937 | Bennett | 174/15 C |
| 2,306,850 | 12/1942 | Usselman | 174/15 C |
| 3,162,716 | 12/1964 | Silver | 174/15 C |
| 3,461,218 | 8/1969 | Buchhold | 174/15 C |
| 3,697,665 | 10/1972 | Doose | 174/DIG. 6 |

FOREIGN PATENTS OR APPLICATIONS

| | | | |
|---|---|---|---|
| 1,573,685 | 7/1969 | France | 174/15 C |
| 1,182,921 | 3/1970 | Great Britain | 174/15 C |

Primary Examiner—Bernard A. Gilheany
Assistant Examiner—A. T. Grimley
Attorney, Agent, or Firm—Wenderoth, Lind & Ponack

[57] ABSTRACT

The invention relates to a method and associated apparatus for cooling power transmission cables, wherein a coolant for cooling the power transmission cables is introduced into a pipe which envelopes cryo resistive or super conducting transmission cables which cables each have conductors provided with coolant ducts therein. The coolant flows through the coolant ducts in the conductors of the transmission cables and absorbs the heat generated in the conductors, the warm coolant is recovered at appropriate points along the transmission cable and transmitted via a return pipe or pipes installed along the cable and cold coolant is introduced into succeeding sections of the transmission cable so as to cool the succeeding sections of the cable conductors and a central cooling station for cooling, introducing and recovering coolant is installed at one end of the return pipe, to enable the entire transmission cable line to be cooled by a single central cooling station.

13 Claims, 6 Drawing Figures

COOLING METHOD FOR TRANSMISSION CABLES

SUMMARY OF THE INVENTION

This invention relates to a cooling method and associated apparatus for power transmission cables in which the temperature of ducts defined by the conductor portion of the cable is kept very low so as to decrease or minimize the electrical resistance of the conductors and make it possible to transmit high capacity power.

Ordinarily, high capacity power is transmitted by means of a transmission line having conductors made of copper or aluminum.

These conductors, however, have resistances at normal temperatures which cause a considerable loss of electricity during transmission. When the cross-sectional area of a conductor inceases, the electrical loss due to resistance decreases. But cables having a large cross-sectional area are not economical and can not easily be wound around a drum. There is, therefore, a practical limit to the size of the cross-sectional area of cables which can be feasibly utilized.

In the prior art, there are some low temperature transmission methods adapted to transmit high capacity power by cooling the conductors and absorbing the heat generated within the conductors due to Joule effect and alternating current loss.

The typical cooling method in prior art using a liquid nitrogen coolant is as follows:

1. super-cooling and compressing liquid nitrogen at a cooling station at an end of a cable line,
2. introducing the liquid nitrogen into a coolant duct in the conductors of transmission cables to cool the conductors from the inside thereof, absorbing the heat generated within the conductors and the heat absorbed by the conductor from the surrounding environment,
3. recovering the liquid nitrogen from the coolant ducts in the conductors once the coolant reaches its saturation temperature which also depends on the coolant pressure,
4. introducing the liquid nitrogen into a separate station having a refrigerating machine to again super-cool and compress the liquid nitrogen, and
5. introducing the coolant into the coolant ducts in the conductors of succeeding cables extending from the separate station to cool the conductors in the manner described in steps 3 and 4 above.

According to this conventional method for cooling the cables, a number of cooling stations equipped with refrigerating installations such as refrigerating machine, heat exchangers and receiving substations are necessary, so that large costs for incidental facilities and buildings, and personnel and operating expenses are incurred.

We have thus developed the improved cooling method of the subject invention wherein a single cooling station is utilized for an entire transmission line rather than a plurality of conventional stations and the low temperature of liquified natural gas is used to refrigerate coolant in order to minimize the cost of preparing coolant.

Accordingly, the principal object of the present invention is to decrease the cost of preparing coolant for use in supercooling a conductor by using the low temperature of liquified natural gas.

A second object of the present invention is to reduce the number of the cooling station required to a single station and consequently to reduce the number of operators required and total operating cost of cooling stations as well as to reduce expenditures for the acquisition of building lots and to increase the overall system reliability by utilizing a single system rather than a plurality of refrigeration stations each of which is liable to fail.

DETAILED EXPLANATION OF THE INVENTION

The present invention relates to a cooling method and apparatus for transmission cables, comprising the steps of supplying coolant through an enveloping pipe which also accommodates super conductive transmission cables having coolant ducts in the conductors contained therein such that coolant is supplied through the enveloping pipe, recovering coolant either through a separate return pipe or the enveloping pipe of a second parallel pipe system and recooling the recovered coolant at a single cooling station.

Figure 5:
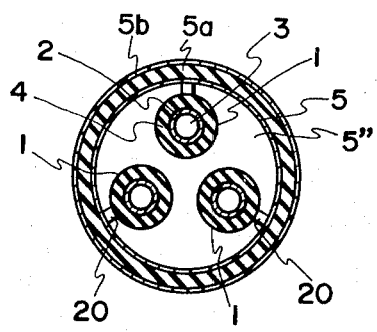
FIG. 5 is a cross-sectional view showing transmission cables within the enveloping pipe and supported by spacers.
Figure 6:
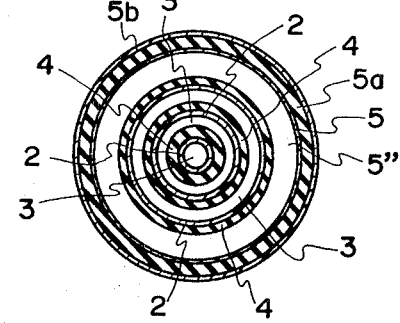
FIG. 6 is a cross-sectional view showing transmission cables situated concentrically in an enveloping pipe.

Referring to the drawings, preferred embodiments of the invention are illustrated. The transmission cable cores 1, 1' consist of conductors 2, 2' having coolant ducts 3, 3' therein. Electrical and thermal insulators 4, 4' are mounted around the conductors 2, 2'. The cables ( 1, 1' ) are placed within the enveloping pipes 5, 5' spaces 5'', 5. 5a and 5a' are thermal insulators covering the enveloping pipes 5, 5' and references numerals 5b, 5b' denote pipe covers. The enveloping pipes 5, 5' are arranged in two rows. A return pipe 6 for recovering coolant runs parallel to the lines. The enveloping pipes 5, 5' and the return pipe 6 are made of materials which do not become brittle at low temperatures, such as aluminum and stainless steel. The transmission cable cores 1, 1' are placed in the enveloping pipes 5, 5' as shown in FIG. 5 and FIG. 6. In the arrangement of FIG. 5, the cables 1, 1' are supported by spacers 20 and in the arrangement of FIG. 6, the cables are concentrically positioned. In case of D.C. transmission, only two cable cores 1, 1' are necessary. The coolant recovering stations 7 are respectively situated at those points where the temperature of the coolant flowing through coolant ducts 3, 3' in the conductors 2, 2' of the transmission cable cores 1, 1' reaches the boiling point of the coolant which is, of course, dependent on the coolant pressure.

The coolant recovering station 7 is constructed with recovery pipes 8, 8' (FIG. 2) which are connected to the coolant ducts 3, 3' and to the collecting pipes 9, 9' which consolidate the coolant collected in the recovering pipes 8, 8'. Stoppers 10 are mounted in the coolant ducts downstream of the locations where ducts 3, 3' communicate with pipes 9, 9'. Inlets 11 are formed through the walls of connectors 2, 2' and the electrical and thermal insulators 4, 4' and are located adjacent the downstream side of the stopper 10. The inlets 11 enable spaces 5'', 5''' to communicate with conduits 3, 3'.

In another embodiment of the present invention, the transmission line consists of a two pipe system, one an enveloping pipe 5 for supplying coolant and other enveloping pipe 5' for recovering coolant. No return pipe is utilized in this embodiment. In a further embodiment, the construction of the coolant recovering station 7 differs from the construction described with reference to FIG. 2.

Figure 4:
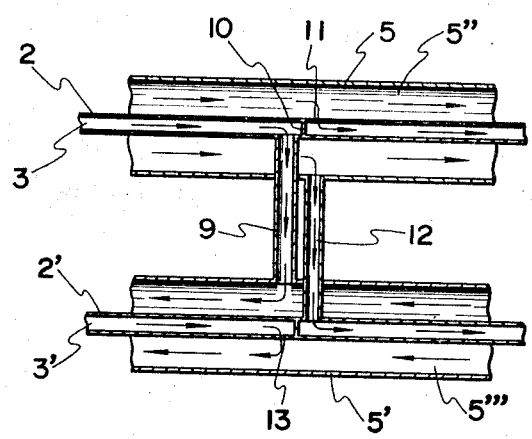
FIG. 4 is a cross-sectional view showing a coolant recovering station employing two enveloping pipes in the system, one acting as a coolant recovering pipe, wherein the coolant recovered from the coolant duct in the conductor of the two circuit pipes is transmitted through this enveloping pipe as the coolant flowing within the coolant duct in the conductor of the transmission cable becomes warm and flows out of the coolant duct into the enveloping pipe. The coolant for cooling succeeding sections of the cable is supplied by the second coolant enveloping pipe and is introduced into the coolant duct in the conductor.

As shown in FIG. 4, the coolant recovering station 7 consists of a collecting pipe 9 connecting the coolant duct 3 within the enveloping pipe 5 with the spacer 5''' in the enveloping pipe 5', while coolant conveying pipe 12 is connected between the space 5'' within the enveloping pipe 5 and the coolant duct 3' in the conductor 2' within the eneveloping pipe 5'. Coolant inlet 11 connects the coolant duct 3 with the space 5'', and the coolant outlet 13 connects the coolant duct 3' with the space 5'''.

Figure 1:
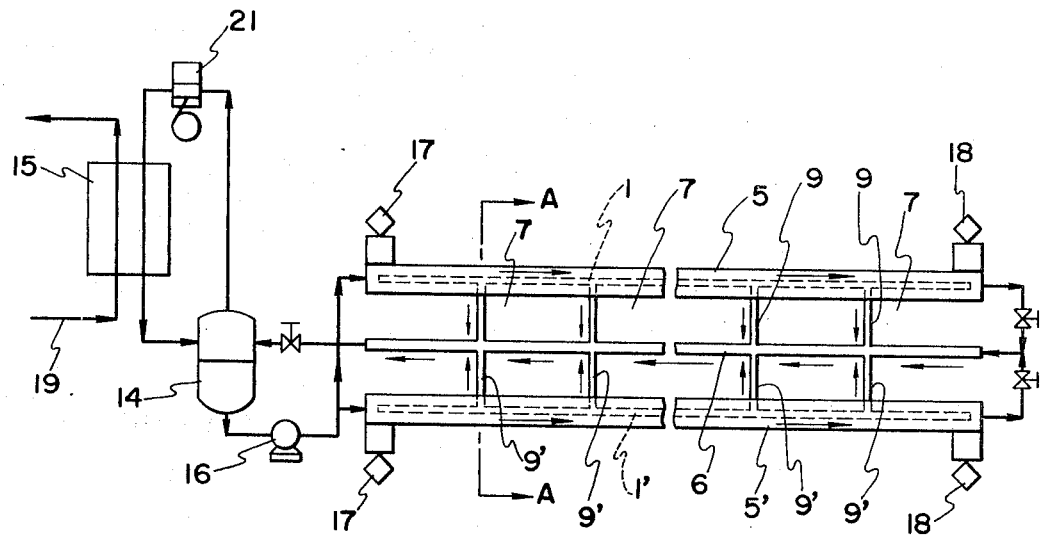
FIG. 1 is a system view of a transmission cable and cooling station illustrating a method using a return pipe next to the cables and recovering warm coolant which is transmitted to the cooling station through the return pipe.
Figure 2:
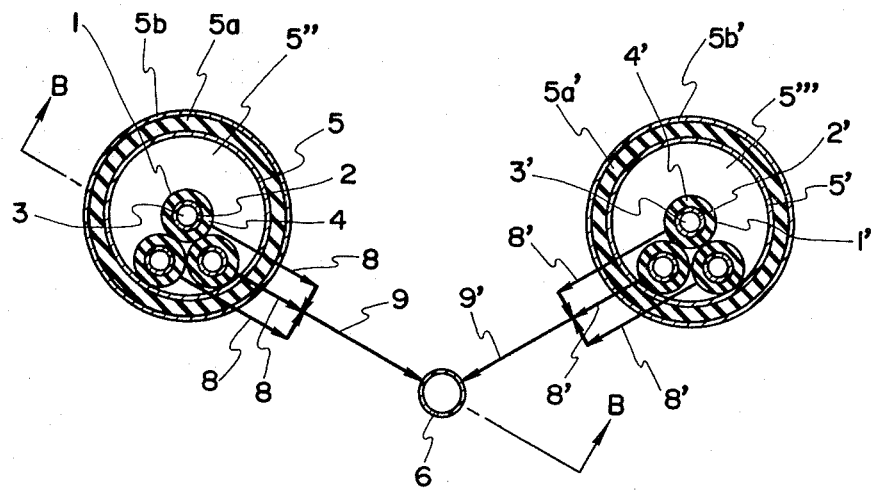
FIG. 2 is a cross-sectional view taken along the line A—A in FIG. 1 in which three cable cores are enveloped in the return pipe and coolant is adapted to be recovered in the direction of the arrow from the coolant ducts in the conductors of cable cores respectively.
Figure 3:
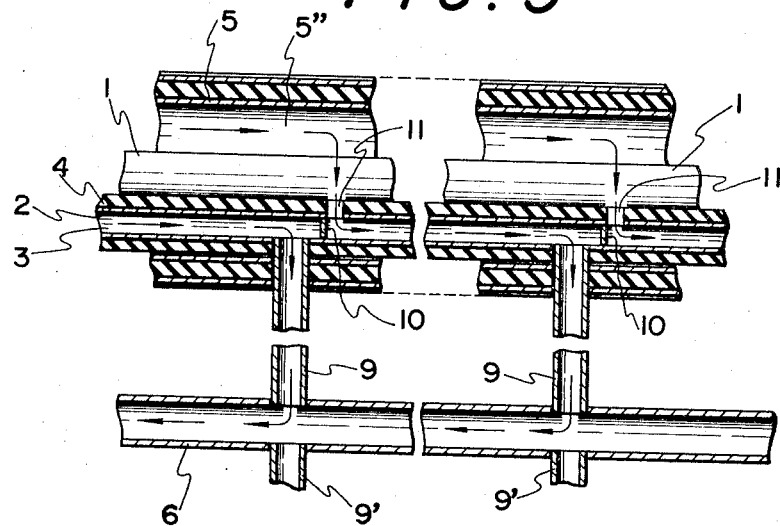
FIG. 3 is a cross-sectional view taken along the line B—B in FIG. 2, illustrating the manner of recovering warm coolant from the coolant ducts in the cable core conductors via the return pipe and introducing coolant which is flowing under pressure within the pipe into the coolant duct of the next section of the cable.

Accordingly, in the coolant recovering station shown in FIGS. 1, 2 and 3, the coolant is forced under pressure through the spaces 5'', 5''' within the enveloping pipes 5, 5', is introduced through the coolant inlet 11 into the coolant ducts 3, 3' in the conductors 2, 2' and then flows through the duct and absorbs the heat generated by the conductors 2, 2'. As the temperature of the coolant approaches its boiling point, the coolant is recovered through the return pipe 6 via the recovering pipes 8, 8' and collecting pipes 9, 9'. The movement and operation of the coolant is carried out independently in each section of the transmission cable, each section having a similar coolant recovering station 7.

With respect to the coolant recovering station 7 of FIG. 4, the coolant is, when its temperature approaches the boiling point, recovered through the enveloping pipe 5' via the collecting pipe 9 and new cold coolant is introduced through the inlet port 11 to the coolant duct 3 in the conductor 2. At the same time the new coolant is introduced by means of the coolant conveying pipe 12 to the coolant duct 3' in the conductor 2' of the cable core 1'. When the coolant flowing through the coolant duct 3' within the enveloping pipe 5' becomes warm, it directly flows out into the enveloping pipe 5' through the coolant outlet 13.

The coolant recovered from the return pipe 6 or enveloping pipe 5' enters the flush drum 14 shown in FIG. 1. In the flush drum 14 a part of the coolant expands and becomes liquid thus returning to its low temperature and the remainder of the coolant is recooled by means of a heat exchanger 15 into a liquid state and is returned to the flush drum 14. The liquid coolant in the drum 14 is forced into the enveloping pipes 5, 5' and the coolant ducts 3, 3' in the conductors 2, 2' by means of a pump 16. In the drawing of FIG. 1, the numeral 18 represents an electrical output terminal and the numeral 21 denotes a compressor.

According to the present invention, liquid natural gas, liquid nitrogen or liquid helium may be employed as the coolant. In case large volumes of liquified natural gas are used as fuel or otherwise, it is most effective to use it directly as a coolant or indirectly as a heat sink (low temperature source) for cooling the coolant. Liquified natural gas is an aryogenic liquid having a temperature of approximately $-162°$ C under normal pressure and 1 kg of the gas absorbs about 200 kilo calories of heat as its temperature rises to the normal boiling temperature. The endothermic effect of liquified natural gas can be employed usefully as a cold source for cooling the coolant or as a coolant itself, and consequently the cost for cooling conductors is markedly reduced.

As above mentioned, liquified natural gas for gasification is introduced into the winding pipe 19 in the heat exchanger 15 as a low temperature.

In case liquified natural gas is employed directly as a coolant, if the liquified natural gas is adapted to be recovered from the end of the line rather than being recovered at the cooling station, the power transmission function and the conveying of the liquified natural gas may be performed by a single line. Thus when electric power and liquified natural gas are both consumed at a single location, the effect of the present invention is increased drastically.

The present invention as described contemplates the use of the low temperature of liquified natural gas so as to reduce conductor cooling cost. In the method for cooling transmission cables of the present invention, only one cooling station is required for the entire line. The return pipe 6 or the enveloping pipe 5' of one of two lines is used to recover the coolant, and the coolant recovered at each coolant recovering station 7 and returned to the refrigerating location is recooled and reused, so that it is not necessary to erect a refrigerating facility at each coolant recovering station 7. Accordingly, the construction costs for the cooling station and the number of required operating personnel are decreased, only a single construction lot for the station is required and therefore the coolant refrigeration costs are substantially decreased.

From the foregoing detailed description it is evident that there are a number of changes, adaptations and modifications of the present invention which come within the province of those skilled in the art.

However, it is intended that all such variations not departing from the spirit of the invention be considered as within the scope thereof.

We claim:

1. A cooling system for cryogenic power transmission cables, which comprises:
   a plurality of enveloping pipes;
   a plurality of power transmission cables operatively positioned within each of said enveloping pipes, each of said plurality of cables having a conducting portion defining a transversely segmented coolant conduit therein;
   a central cooling station operatively connected to each of said segmented power transmission cable coolant conduits and including means to circulate cold coolant through said enveloping pipes;
   a return pipe operatively connected to said central cooling station;
   a plurality of coolant recovery stations operatively connected to said return pipe and to each segment of said power transmission cable coolant conduits at locations such that coolant warmed in said conduits is removed from said conduits and returned to said central cooling station for recooling; and
   means connecting each of said segments of said transversely segmented power transmission cable to said cold coolant to supply cold coolant thereto.

2. A cooling system for a power transmission cable as defined in claim 9 wherein said coolant is liquified natural gas.

3. A cooling system for a power transmission cable as defined in claim 1 wherein liquified natural gas is used as a refrigerant at said central cooling station.

4. A cooling system for a power transmission cable as defined in claim 1 wherein the coolant is liquified natural gas and a liquified natural gas consuming means is operatively connected to the system at an end of the power transmission cables.

5. A cooling system for cryogenic power transmission cables, which comprises:
   a central cooling station for cooling warm coolant and including means to circulate cold coolant;
   a plurality of enveloping pipes;
   a plurality of power transmission cables positioned within each of said plurality of enveloping pipes, each of said plurality of cables having a conductive portion defining a transversely segmented coolant conduit therein for receiving cold coolant circulated by said central cooling station;
   said enveloping pipes operatively connected to said central cooling station such that a first of said pipes can receive cold coolant therefrom and a second of said pipes can return warm coolant thereto;
   each of said conduit segments of said power transmission cables being operatively connected to said first and second pipes such that cold coolant can be supplied to each segment of said conduit segments and warm coolant can be removed therefrom.

6. The cooling system for cryogenic power transmission cables of claim 5 further comprising a stopper defining each end of each of said segments of said conduits.

7. The cooling system for cryogenic power transmission cables of claim 6, further comprising a plurality of inlet means defined in each of said plurality of cables located within said first pipe, one inlet means located adjacent an end of each of said conduit segments of the cables positioned in said pipe, said inlet means defining a passage between said conduit segment and said pipe, said segments capable of receiving said cold coolant therethrough;
   a plurality of first connecting conduits, each of said first connecting conduits operatively connected between said second pipe and one of said conduit segments in the cables in said first pipe and positioned adjacent the end of each of said segments opposite the end defining said inlet means such that warm coolant is transferred from each of said segments to said second pipe;
   a plurality of exit means defined in each of said plurality of cables located within said second pipe, one exit means located adjacent an end of each of said conduit segments of the cables positioned in said second pipe, said exit means defining a passage between said segments and said second pipe for transferring warm coolant from said conduit segments to said second pipe; and
   a plurality of second connecting conduits, one of said second connecting conduits operatively connected between said first pipe and each of said conduit segments adjacent the end of each of said segments opposite the end defining the exit means in said second pipe.

8. A cooling system for a power transmission cable as defined in claim 5 wherein said coolant is liquified natural gas.

9. A cooling system for a power transmission cable as defined in claim 5, wherein liquified natural gas is used as a refrigerant at said central cooling station.

10. A cooling system for a power transmission cable as defined in claim 5, wherein the coolant is liquified natural gas and a liquified natural gas consuming means is operatively connected to the system at an end of the power transmission cables.

11. A method for cooling a cryogenic power transmission cable which comprises:
   pumping cold coolant from a central cooling station through at least one enveloping pipe;
   supplying said cold coolant to a plurality of power transmission cables, each defining transversely segmented coolant conduits therein and each of said segments being operatively connected to one of said enveloping pipes for receiving cold coolant therefrom;
   removing coolant warmed by heat as it flows through the cable segment from each of said segmented conduits; and
   returning said warmed coolant to said central cooling station for recooling thereof.

12. The method of claim 11 wherein the coolant is liquified natural gas.

13. The method of claim 11 wherein said coolant is liquified natural gas and wherein a liquified natural gas consuming means is operatively connected at an end of said cable.

* * * * *